(12) United States Patent
Huber et al.

(10) Patent No.: US 6,294,118 B1
(45) Date of Patent: Sep. 25, 2001

(54) METHOD FOR PRODUCING SORBENTS ON THE BASIS OF A CELLULOSE-CONTAINING MATERIAL AND CLAY MINERALS

(75) Inventors: Werner Huber, Moosburg; Petra Sellmayr, Wartenberg; Otto Haubensak, Brannenburg, all of (DE)

(73) Assignee: Sud-Chemie AG (DE)

( * ) Notice: Subject to any disclaimer, the term of this patent is extended or adjusted under 35 U.S.C. 154(b) by 0 days.

(21) Appl. No.: 09/331,435

(22) PCT Filed: Dec. 19, 1997

(86) PCT No.: PCT/EP97/07208

§ 371 Date: Aug. 5, 1999

§ 102(e) Date: Aug. 5, 1999

(87) PCT Pub. No.: WO98/26650

PCT Pub. Date: Jun. 25, 1998

(30) Foreign Application Priority Data

Dec. 19, 1996 (DE) ................................. 196 53 152

(51) Int. Cl.$^7$ ............................. B01J 20/12; B01J 20/24; B29B 9/02

(52) U.S. Cl. ............................. 264/118; 119/173; 502/80; 502/400

(58) Field of Search .......................... 264/118; 501/141; 502/80, 400; 119/173

(56) References Cited

U.S. PATENT DOCUMENTS

| | | |
|---|---|---|
| 4,341,180 | 7/1982 | Cortigene et al. . |
| 4,458,629 | 7/1984 | Gerber . |
| 4,591,581 | 5/1986 | Crampton et al. . |
| 4,657,881 | 4/1987 | Crampton et al. . |
| 5,000,115 | 3/1991 | Hughes . |
| 5,062,954 | 11/1991 | Leedy et al. . |
| 5,188,064 | 2/1993 | House . |
| 5,452,684 | 9/1995 | Elazier-Davis et al. . |
| 5,456,284 | 10/1995 | Ryan et al. . |
| 5,648,306 | 7/1997 | Hahn et al. . |

FOREIGN PATENT DOCUMENTS

| | | |
|---|---|---|
| 4311488 | * 10/1994 | (DE) . |
| 43 41 923 | 6/1995 | (DE) . |
| 3 51 473 | 1/1990 | (EP) . |

OTHER PUBLICATIONS

Abstract of EPO 619140 (Oct. 12, 1994).*
Abstract of German 3816225 (Nov. 23, 1989).*
Abstract of German 4101243 (Jul. 23, 1992).*
Abstract of German 4327159 Feb. 16, 1995).*
Abstract of German 4338362 (May 11, 1995).*

* cited by examiner

*Primary Examiner*—Leo B. Tentoni
(74) *Attorney, Agent, or Firm*—Scott R. Cox

(57) ABSTRACT

The invention relates to a method for producing sorbents on the basis of a cellulose-containing material and at least one smectic clay mineral capable of swelling, which form lumps when absorbing liquids. The method is characterized in that: (a) the cellulose-containing material and smectic clay mineral in fine particle form are intimately mixed together, whereby total water content of the components to be mixed is between approximately 25 and 40 weight percent, or is adjusted to be within this range by the addition of water (b) this mixture is compressed by means of a matrix press, and (c) the compressed moulded bodies emerging from the matrix press are cut substantially perpendicular to the direction of emergence and dried. The invention further relates to a sorbent obtained by the above procedure and its use.

15 Claims, No Drawings

METHOD FOR PRODUCING SORBENTS ON THE BASIS OF A CELLULOSE-CONTAINING MATERIAL AND CLAY MINERALS

DESCRIPTION

The invention concerns a process for production of sorbents based on cellulose-containing material and at least one smectitic clay mineral for absorption of liquid. These sorbents are suitable to absorb any liquids; they are particularly suited as litter for domestic animals, for which reason the subsequent comments refer to this area of application.

Keeping of domestic animals, especially in a city environment, is increasingly connected with the use of litter. This has the task of absorbing liquids released by the animal. It is also supposed to remove the semisolid, moist animal excrements and excretions and thus reduce odor development. Good litters are also supposed to absorb the discharge or released liquid with formation of a compact clump, which can be simply and thriftily removed. An optimal litter should therefore have high absorption capacity and fully absorb the liquid discharged by the animals within the charge without wetting the bottom of the litter box.

The litters found on the market are organic substances, like straw, sawdust, wood chips, bark, shredded paper, cellulose fibers, agricultural residues, etc.; these are used alone or in mixtures with inorganic material. The drawback of organic litters is the frequently nonexisting or insufficient clump formation and its consistency, as well as their tendency toward bacterial decomposition, especially in cooperation with moisture.

A sorbent, especially a litter for domestic animals based on swellable smectitic clay minerals, is known from U.S. Pat. No. 5,000,115, which can additionally contain sand or cellulose-containing materials, like wood shavings or chips and ground paper. The components are mixed dry without compaction.

A process to produce litters for domestic animals is known from U.S. Pat. No. 4,341,180, according to which water-containing wastepaper residues are dewatered to a water content of about 32 to 40%, pressed, pelletized and dried after addition of sodium bicarbonate as deodorant. The paper residues can contain about 10 to 50% ordinary paper fillers, like kaolin. The described fillers are not swellable, for which reason the litter do not form clumps during absorption of liquids.

A litter and method for its production are known from DE-A-41 01 243, according to which cellulose, cellulose derivatives and/or cellulose-containing materials of agricultural or industrial origin, as well as wood wastes, like sawdust, with a particle size of up to 1 mm are mixed or agitated with ballast agents and thickeners, like bentonite, in the presence of water, the mixture is dewatered without compaction to a residual water content of no more than 10 wt % and the remaining residue ground to a particle size above 1 mm. The ballast agent is added in an amount so that the bulk density of the litter after drying lies above about 500 kg/m$^3$. The higher bulk density relative to the organic litters is mentioned as advantageous.

A litter based on cellulose-containing material as wet substance and a capillary-active, small-grained material, like ground limestone, wood flour, ground clay, bentonite or ground pumice is known from DE-A-38 16 225. Recovered paper stock as wet substance with a moisture content of 50 to 60% and ground pumice with a moisture content of less than 30% are preferably mixed and then dried. During use of a mixture of wood flour and cellulose fibers compaction occurs in a screw compactor. However, compaction is left out during the use of inorganic capillary-active substances. The litter is crumbly and has a high percentage of fine-dust material. During addition of liquids it does not form clumps.

A method for production of sorbents based on smectite to absorb liquids is known from DE-A-4 338 362, in which (a) a smectite with a water content of less than 6 wt %; (b) a mass of fibrous cellulose and organic pigments occurring during processing of papermaking effluents; and (c) anhydrous calcium sulfate or calcium sulfate hemihydrate are mixed, compacted and pulverized; the amount ratio between (a), (b) and (c) is chosen so that the water content of the granular material is less than 20 wt %. During compaction pieces are formed with a broad particle size distribution, which are then ground, during which a relatively large amount of fine-dust material is formed.

A method is known from EP-B-0 663 793 (DE-A-43 27 159) for production of sorbents based on smectites and cellulose-containing materials with low bulk density, in which a moist mixture of smectite and ground wood material or another cellulose-containing material of plant origin, i.e., cellulose-containing primary raw material, is treated during internal shear with subsequent extrusion and then dried and granulated. During granulation a relatively high percentage of finely divided material is formed.

A method to produce a clump-forming litter is disclosed In U.S. Pat. No. 5,456,284, in which a smectitic clay is mixed before or after extrusion with a small percentage of a water-soluble adhesive or binder, for example CMC.

Sorbents based on clay mineral particles with a particle size from 710 μm to 4 mm are known from EP-A-0 087 001, which represent compacted masses of particles of less than 2 mm. The clay mineral particles are joined together by water-soluble or water-dispersible substances, like cellulose derivatives, e.g., carboxymethylcellulose, or starches. Use of a cellulose-containing material not swellable in water is not described.

Finally, a method is known from DE-A-43 11 488 (EP-A-0 619 140) for production of sorbents based on cellulose fibers, ground wood material and clay minerals, in which a finely divided cellulose-containing material with an average fiber length of 0.4 to 3 mm and residual moisture of 5 to 15 wt % and/or a ground wood material with an average fiber length of 0.05 to 2.0 mm and a residual moisture of 10 to 20 wt % and a smectitic clay mineral in finely divided form with an average particle size of 0.1 to 1.0 mm, a residual moisture content of 5 to 15 wt % and a smectite content of at least 50 wt % are homogeneously mixed and the compacted mixture ground. Compaction occurs by means of pressing rolls (briquetting rolls or press granulation rolls). A relatively high percentage of finely divided material is formed during size reduction.

It has now been found relative to the prior art just described that the properties of sorbents, especially litters, can be substantially improved if the components, essentially smectitic clay material(s) and finely divided cellulose-containing materials are compacted under high pressure at a precisely set water content, making sure that the percentage of finely divided material is kept as low as possible.

The invention therefore concerns a method for production of sorbents based on cellulose-containing material and at least one swellable smectitic clay mineral, which form clumps on absorption of liquid; the method is characterized by the fact that (a) the cellulose-containing material and the smectitic clay material are thoroughly mixed in finely divided form, the total water content of the components being mixed lying between about 25 and 40 wt % or being adjusted to this range by adding water, (b) the mixture is compacted using a die press and
(c) the compacted molded articles leaving the die press are cut essentially across the direction of emergence and dried.

Cellulose-containing material is understood according to the invention to be a material that virtually does not swell in water and therefore has no binder properties either, in contrast to the cellulose derivatives described in EP-A-0 087 001.

The sorbents produced according to the process of the invention are relatively light so that they can be better transported and handled by consumers. For example, a litter box can be easily filled and emptied. The sorbents so produced also exhibit excellent clump formation, in which the clumps to be disposed of have reduced weight; they do not form dust and have excellent absorption capacity. It is presumed, without being wedded to this theory, that the advantageous properties are attributed at least partially to particularly intimate bonding between the cellulose-containing material and the smectitic clay mineral.

To achieve the advantages according to the invention it is important that the water content of the mixture lie in a very narrow range between about 25 and 40 wt %, especially between 28 and 35 wt %. If the water content lies outside of this range, the properties of the obtained sorbent deteriorate and, for example, higher bulk density, poorer absorption properties or a deterioration in clump formation are obtained.

For example, in comparison with compaction at low water content, at the water content according to the invention unduly severe compaction is prevented during molding since the water is scarcely compressible. Advantageous low bulk densities could therefore be achieved.

A certain porosity can also be formed during subsequent drying of the composition, preferably to a residual water content of about 5 to 15 wt %, since cavities are formed during drying by evaporation of the water and shrinkage of the cellulose-containing materials, for example, wood fibers. This not only gives the advantage of low bulk density, but the cavities are then also available for absorption of liquids and gases so that the absorption properties of the sorbent are improved. Finally, the capillary effects occurring in the small cavities lead to more rapid absorption of liquid.

The essential water content of the mixture according to the invention during molding can be present either already in the individual components, like the cellulose-containing material and the smectitie clay material(s), or be set before molding, preferably by addition of water or aqueous solutions. According to the second variant water is added to the dry mixture that contains the cellulose-containing material and the smectitic clay mineral(s) with a total water content of less than about 25 wt % until the total water content lies between about 25 and 40, especially between about 28 and 35 wt %. In the first variant a dry mixture is not started with, but moist starting materials are used instead so that addition of water before molding is unnecessary.

It has surprisingly turned out that during molding with the mentioned water content a particularly favorable energy input to the mixture occurs. Shifting of the layers of smectitic clay mineral (delamellation) probably occurs, during which the water serves as mediating element during formation of the internal bonding during molding. Because of this, advantageous properties of the finished sorbent are obtained, like improved clump formation and reduced dust development. A lighter cellulose-containing material can also be used because of this so that a particularly low bulk density can be achieved without loss of the positive properties just mentioned.

The mixture of cellulose-containing material and smectitic clay mineral according to the invention is compacted using a die press. Flat die presses and cylindrical die presses are distinguished here.

A flat die press represents essentially a cylindrical vessel with a flat, perforated bottom plate against which one or more revolving rolls are pressed. Two rolls are preferably arranged over the bottom plate, rotating on the one hand, around an axis in the center of the cylindrical vessel and, on the other hand, on an axis perpendicular to this in the manner of an edge mill. The moist mixture of cellulose-containing material and smectitic clay mineral is compacted, on the one hand, in the gap between the perforated bottom plate and the rotating roll(s) and, on the other hand, during passage through the openings of the perforated bottom plate A cylindrical die press contains a perforated outer cylinder instead of the flat perforated bottom plate, in which at least one roll is situated that rotates around its axis and/or the axis of the outer cylinder and is pressed against the inside wall of the outer cylinder. The moist mixture of cellulose-containing material and smectitic clay minerals is compacted, on the one hand, in the gap between the perforated outer cylinder and the rotating roll(s) and, on the other hand, during passage through the openings of the outer cylinder. In another variant of the cylindrical die press the perforated outer cylinder rotates, while the roll(s) is (are) stationary in the interior of the outer cylinder.

Elongated molded elements that are either cylindrical or polygonal, depending on the shape of the openings in the flat bottom plate or in the outer cylinder, are obtained with both the flat die presses and with the cylindrical die presses. The elongated molded elements are cut essentially across the direction of emergence, which can occur, for example, by means of a blade-like stripper arranged beneath the perforated bottom plate or on the outer wall of the perforated cylinder. In this manner it is not essential to break the molded elements after drying in a separate process step so that the percentage of fine fractions, especially dust-like fractions, can be reduced.

Should these form to a limited degree, the ground and dried molded elements are freed of them (for example, by screening) and the separated fine fractions are optionally returned to the mixing stage.

The energy input during press granulation should generally lie between about 3 and 9 kWh/t, especially between about 5 and 7 kWh/t.

Use of a swellable smectic clay mineral is of significance in order to achieve the full advantages according to the invention, since nonswellable clay materials, like kaolin, have low water absorption capacity and no clump formation occurs. Swellable minerals of the montmorillonite group can be used as smectitic clay mineral, like bentonite, or also hectorite, glauconite, sauconite, illite, etc. Mixtures of different clay minerals can also be used.

According to a preferred variant one starts from a Ca and/or Na smectite, especially a Ca and/or Na bentonite with a water absorption capacity (referred to dry weight) of at least about 60%, preferably at least 120%, especially about 120 to 300% and a smectite content of about 50 to 95 wt %. In addition to smectite, the smectitic clay mineral can contain other accessory minerals, like mica, feldspar and quartz.

According to another preferred variant, a mixture of calcium and sodium bentonite is used, since particularly advantageous properties of the sorbent can be set by the cooperation of these components. Such a mixture can be produced from calcium bentonite and natural sodium bentonite; however, it is also possible to convert calcium bentonite by activation with alkali (for example, sodium carbonate or other sodium salts) partially to sodium bentonite, in which case a very intimate mixture is obtained. Calcium bentonite has particularly rapid water absorption, whereas sodium bentonite has particularly high (although slower) absorption, but improves clump strength. The weight ratio between calcium and sodium bentonite is preferably about 2.5:7.5 to 7.5:2.5. Cooperation of these two components is further promoted by processing according to the invention and intimate bonding with the cellulose-containing material.

The weight ratio between the finely divided cellulose-containing material and the smectitic clay material, preferably lies between about 1:9 and 6.5:3.5, especially between about 3:7 and 6:4. Although, depending on the specific cellulose-containing materials and clay minerals employed in individual cases, weight ratios deviating from this can also be advantageous, excellent clump formation is achieved in the mentioned ranges.

A finely ground pulp (native cellulose) and/or a cellulose material containing secondary fibers (for example paper fibers) is preferably used as cellulose-containing material, with an average fiber length of about 0.1 to 2 mm, preferably about 0.3 to 0.8 mm. With particular preference wood flour and/or a material containing ground wood chips with an average particle size of about 0.1 to 2 mm, preferably about 0.1 to 1.0 mm is used. This type of material because of its resin content has a pleasant intrinsic odor. Mixtures of finely divided cellulose fiber-containing material and ground wood material can also be used.

According to another preferred variant a limited amount of at least one hydrophilic binder, like starches, carboxymethylcellulose, polyacrylates, polyvinyl alcohol or polyvinylpyrrolidone, especially guar flour is added to the mixture of cellulose-containing material and smectitic clay material. The added amount preferably lies between 0.5 and 10 wt %. Addition of the hydrophilic binder has a positive effect on the properties of the sorbent produced according to the method of the invention, further intensifying bonding of the clay material to the cellulose-containing material. In the presence of a binder the percentage of cellulose-containing material in the sorbent can be further increased without losing the aforementioned advantageous properties. Thus, a lower bulk density is possible. The binder plays a dual function in the sorbent, reducing dust formation, on the one hand, and leading to improved clump formation, on the other.

Optimization of the spreading properties can be achieved by the fact that the ground and dried molded elements have a size from about 0.1 to 10 mm, preferably from about 0.5 to 4 mm, the percentage of fraction from about 0.5 to 2 mm being about 20 to 25 wt % and the percentage of fraction from 2 to 4 mm being about 80 to 65 wt %.

The size of the ground and dried molded element during use of a die press is dictated, on the one hand, by the size of the openings in the perforated bottom plate or in the perforated outer cylinder and, on the other hand, by the length of the molded element divided by means of the stripper. In this case breaking of the dried molded elements is no longer essential.

The object of the invention is also a sorbent that can be obtained according to the method just described and forms clumps when moistened with liquids, characterized by a residual moisture of about 5 to 15, preferably about 5 to 10 wt %, and a water absorption capacity of at least about 100 wt %, preferably at least 120 wt % (referred to the agent dried to a residual moisture of 6 wt %). The clump formed during moistening with liquids (especially with aqueous liquids) is compact and can be fully and selectively removed from the sorbent without breaking with a slotted scoop (explained below).

The hardness and strength of the clumps increase with residence time and degree of drying. The sorbent according to the invention does not form dust and exhibits excellent absorption properties.

The sorbent according to the invention usually has a bulk density of about 300 to 700 g/L, preferably about 400 to 600 g/L.

The sorbent according to the invention can also be mixed with known sorbents. The known sorbent can also contain white pigments, disinfectants, fragrances and/or animal attractants, as well as other auxiliaries known in the prior art.

The object of the invention is also a use of the aforementioned sorbent as a packing material, absorbent for liquids (like body fluids, urine, blood, sputum), oil, liquid chemicals, as well as litter for domestic animals, especially cat litter, for example in litter boxes.

The properties of the sorbent according to the invention are generally determined as follows:

1. Water absorption capacity

According to a modification of method 17-A of Westinghouse, 20 g of granular sorbent is weighed into a weighed conical wire sieve with a diameter of 7 cm and a height of 7.6 cm.

The filled sieve is then suspended in a beaker filled with water so that the material is fully covered with water. After an absorption time of 20 minutes the sieve is suspended for another 20 minutes in an empty beaker for draining. After completion of the drainage time the sieve is weighed again with the contents. The water absorption capacity (%) corresponds to the equation 100×E/D, in which E is the amount of absorbed water and D is a weighed amount of the granular material.

2. Water content

A granulate sample is dried in a desiccator to constant weight; the content of adsorbed water is determined from the weight difference before and after drying. In particular, 10 to 20 g granulate is weighed into a flat dish to within 0.01 g and dried in a desiccator at 100° C. to constant weight (at least 2 hours). The sample is then allowed to cool off in the desiccator to room temperature and weighed. The water content is calculated as follows:

Water content (%)=[(Initial weight−Final weight)/Initial weight]×100

The water content of the cellulose-containing material with a smectitic clay mineral (100° C.) can be determined accordingly.

3. Absorption test

Water is added from a 50 mL buret to a leveled and not compacted charge of granular sorbent in a glass dish (diameter 140 mm, height 75 mm, filling height 50 mm) and the penetration depth observed. The outlet of the buret is introduced at a height of 3 to 4 cm into the center of the charge, whereupon 60 mL of tap water is allowed to run out within 55 to 60 seconds. After a waiting time of 3 minutes it is checked on the bottom of the dish whether water has passed through the layer; passage is recognizable by discoloration of the granular material on the bottom of the dish. Evaluation is carried out as follows:

discoloration on bottom of dish not visible: test passed;

discoloration on bottom of dish visible: test not passed.

4. Clump formation

The conical clump formed during the absorption test, which generally has a horizontal diameter of about 30 to 50 mm and a vertical dimension of about 10 to 50 mm, is removed with a slotted scoop with a diamond-shaped pattern (dimensions of the scoop surface 80×120 mm; mesh width 11×11 mm, crosspiece width 0.3 mm) and evaluated according to the following criteria:

Solid clump:

the clump can be fully removed with the slotted scoop and remains stable during and after removal;

the clump exhibits plastic behavior and only breaks into larger fragments during stronger pressure between the fingers.

Moderately strong clump:

the clump is deformed during and after removal, but can be fully removed with the slotted scoop;

the clump breaks down into smaller fragments during slight pressure between the figures.

5. Bulk density

A 500 mL graduated cylinder is first weighed while empty. A powder funnel with an opening of about 15 cm and an outlet opening of about 3 cm is placed on it and filled with the sorbent granulate within about 5 seconds. The powder funnel is then removed from the graduated cylinder so that the granulate in it forms a protruding cone. This is scraped off with a wide spatula along the rim of the graduated cylinder. The filled graduated cylinder is freed on the outside of adhering grains or dust and reweighed. The bulk density is calculated as follows:

Bulk density (g/L)=2×net weight (g/500 mL)

The invention is explained by the following examples.

EXAMPLE 1

Comparison

About 2 kg of a mixture consisting of 50 wt % ground wood flour (about 10 wt % water, particle size about 0.5 mm) and 50 wt % of a ground mixture of 20 wt % Ca bentonite and 30 wt % Na bentonite (water absorption capacity of the bentonite mixture about 200%) with a water content of about 12.5 wt % is set at a moisture content of 23.4 wt % by addition of water. The wood flour and bentonite mixture are intimately mixed and compacted in a flat die press from the Kahl Co. (type 14-175) by compression molding. This flat die press is an essentially cylindrical vessel with an inside diameter of about 20 cm with a perforated bottom plate (hole diameter 3 mm), in which two rolls that rotate around the cylinder axis are provided. The rolls exert a pressure on the moist mixture of wood flour and bentonite mixture so that the moist mixture is forced through the perforated bottom plate. The energy input is about 6 kWh/t. The molded elements passing through the perforated plate are divided by a cutting device arranged beneath the perforated plate (stripper) across their longitudinal axis into pieces with a length of about 3 mm. Smaller fragments already appear during cutting. The obtained granulate is dried for about 6 hours at 80° C. to a residual water content of 7.5 wt %, during which it already crumbles at limited pressure. The granulate is screened, the fine fraction (<0.5 mm) amounting to about 30%.

The other properties of the obtained granulate are shown in the table.

EXAMPLE 2

Comparison

The working method of example 1 was repeated with the deviation that the water content of the wood flour-bentonite mixture was set at 40.3 wt %. The granulate was dried to a residual water content of 6.5 wt %. After drying and screening the fine fraction (<0.5 mm) was less than 2 wt %.

The other properties of the obtained granulate are shown in the table.

EXAMPLE 3

Invention

The working method of example 1 was repeated with the deviation that the water content of the wood flour-bentonite mixture was set at 30.2 wt % before compaction. After drying the residual water content was 4.5 wt %.

The other properties of the obtained granulate are shown in the table.

EXAMPLE 4

Invention

The working method of example 3 was repeated with the deviation that 3 wt % guar flour was added to the moist wood flour-bentonite mixture before compaction. The water content before compaction was 30.9 wt %. After drying the granulate had a residual water content of 6.8%

Other properties of the obtained granulate are shown in the table.

EXAMPLE 5

Invention

The working method of example 3 was repeated with the deviation that cellulose fibers with an average fiber length of 1 mm and a water content of 35 wt % were used as cellulose-containing material. This material was intimately mixed with the same amount of bentonite mixture of example 1 (water content 12.5 wt %) in a 1:1 ratio, during which water was added so that the water content of the mixture before compaction was 34.0 wt %. After drying the granulate had a residual water content of 5.8%.

The other properties of the obtained granulate are shown in the table.

TABLE

| Example | Water content Before compaction (wt %) | Water content After drying (wt %) | Bulk density (d/L) | Water absorption capacity (wt %) | Absorption test | Clump formation | Fine fraction (<0.5 mm) (wt %) |
|---|---|---|---|---|---|---|---|
| 1 (comparison) | 23.4 | 5.7 | 602 | 509 | passed | firm | 30 |
| 2 (comparison) | 40.3 | 6.5 | 481 | 319 | did not pass | moderately firm | <2 |
| 3 (invention) | 30.2 | 5.4 | 507 | 488 | passed | firm | 2 |
| 4 (invention) | 30.9 | 6.8 | 497 | 423 | passed | firm | 2 |
| 5 (invention) | 34.0 | 5.8 | 492 | 495 | passed | firm | 2 |

The table shows a very high fine fraction of the sorbent according to comparative example 1, which is caused by the low water content before compaction. Otherwise this sorbent passed the absorption test and clump formation was satisfactory.

The sorbent according to comparative example 2 because of its high water content before compaction had low water absorption capacity. Its fine fraction was relatively low, but it did not pass the absorption test. The clumps were also only moderately firm.

The sorbent according to the examples 3 to 5 of the invention with a water content in the claimed range before compaction had a very low percentage of fines and passed both the absorption test and the clump formation test. They were also characterized by a high water absorption capacity.

Comparative examples 1 and 2 also show that the use of a die press alone is not sufficient to achieve the objective of the invention, i.e., a combination of this feature with the feature of a specified water content before compaction matters.

SUMMARY

A method is described to produce sorbents based on cellulose-containing material and at least one swellable smectitic clay mineral, which form clumps on absorption of liquid. The method is characterized by the fact that (a) a cellulose-containing material and the smectitic clay mineral are intimately mixed in finely divided form, the total water content of the components being mixed lying between about 20 and 40 wt % or being set at this range by addition of water, (b) the mixture is compacted using a die press and (c) the compacted molded elements emerging from the die press are cut essentially across the direction of the emergence and dried. The invention also concerns a sorbent obtainable according to this method and its use.

What is claimed is:

1. A method for the production of a sorbent based on a cellulose-containing material and at least one swellable smectitic clay mineral, which sorbent forms clumps on absorption of liquids, comprising
    a) intimately mixing the cellulose-containing material and the smectitic clay mineral components in finely divided form, wherein the overall water content of the components being mixed is adjusted to a range between about 25 and 40 wt. % by the addition of water, if the overall water content is below the range of about 25 to 40 wt. %;
    b) compacting the mixture using a die press;
    c) cutting the compacted molded elements emerging from the die press essentially across the direction of emergence; and
    d) drying the cut product to form the sorbent.

2. The method of claim 1 wherein the overall water content of the components is between 25 and 40 wt. %.

3. The method of claim 1 further comprising screening the fine fractions of the dried product and introducing those fine fractions into the mixing step with the components.

4. The method of claim 1, wherein the water content of the components is adjusted to a range between about 28 and 35 wt. % by the addition of water, if the overall water content is below the range of about 28 to about 35 wt. %.

5. The method of claim 1, wherein the energy input during compacting is between about 3 and 9 kWh/t.

6. The method of claim 1, wherein the smectitic clay mineral comprises a Ca or Na smectite with a water absorption capacity of at least about 60 wt. %, when referenced to dried smectite with a residual moisture content of 6 wt. %.

7. The process of claim 6 wherein the water absorption capacity of the smectitic clay mineral is at least about 120 wt. %.

8. The method of claim 1, wherein the cellulose-containing material is selected from the group consisting of a finely ground pulp, a cellulose material containing secondary fibers, wood flour, wood chips, and mixtures thereof.

9. The method of claim 1, wherein the cellulose-containing material is selected from the group consisting of a material containing cellulose fibers with an average fiber length of about 0.1 to 2 mm and a water content of about 30 to 40 wt. %, a wood flour, a material containing ground wood chips with an average particle size of 0.1 to 2.0 mm and a water content of about 30 to 40 wt. %, and mixtures thereof.

10. The method of claim 1, wherein the weight ratio between the cellulose-containing material, and smectitic clay mineral is between about 1:9 to 6.5:3.5.

11. The method of claim 1, wherein the weight ratio between the cellulose-containing material, and smectitic clay mineral is between about 3:7 to 6.4:3.5.

12. The method of claim 1 further comprising adding about 1–10 wt. %, when referenced to the moist mixture, of a hydrophilic binder, to the mixture.

13. The method of claim 12 wherein the hydrophilic binder comprises guar flour.

14. The method of claim 1 wherein particles of the sorbent have a size from about 0.1 to 10 mm, and wherein the percentage of the particles of sorbent from 0.5 to 2 mm is from about 20 to 35 wt. % and the percentage of the particles of the sorbent from 2 to 4 mm is from about 80 to 65 wt. %.

15. The method of claim 14, wherein the particles of the sorbent have a size from about 0.5 to 4 mm.

* * * * *